Nov. 15, 1966  E. SCHASCHL  3,286,174
APPARATUS AND METHOD FOR MEASURING HIGH TEMPERATURE
CORROSION AND FLUID FLOW RATES
Filed Dec. 6, 1965
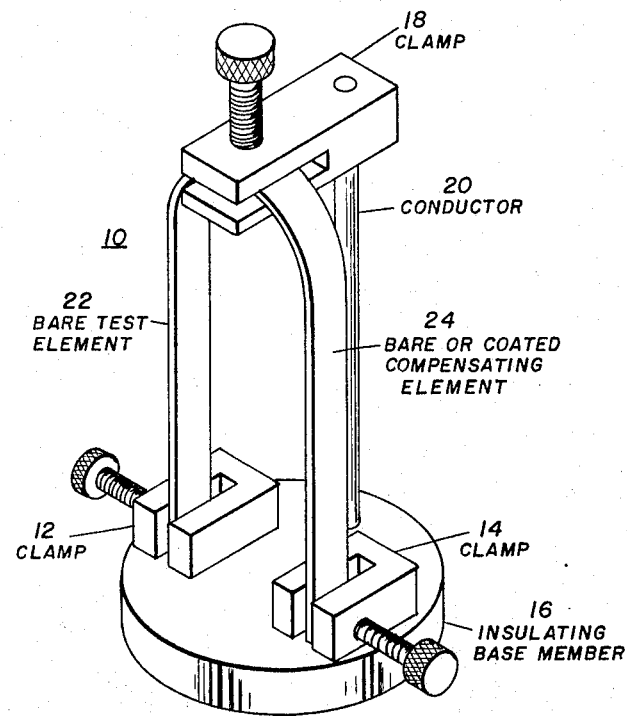
FIG. I
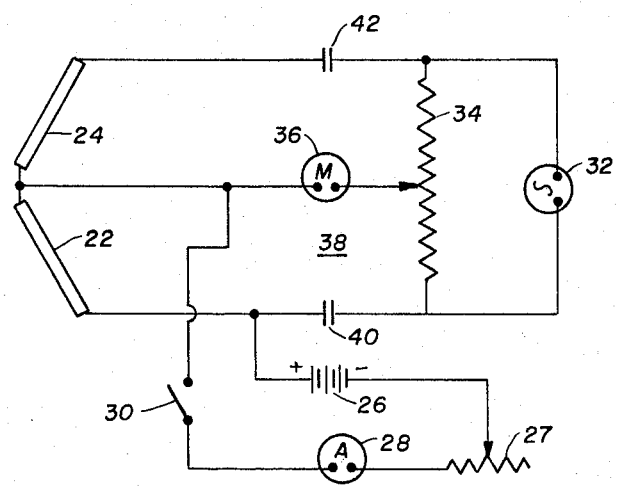
FIG. 2
INVENTOR.
EDWARD SCHASCHL
BY
Edward H. Lang
ATTORNEY.

United States Patent Office 3,286,174
Patented Nov. 15, 1966

3,286,174
APPARATUS AND METHOD FOR MEASURING HIGH TEMPERATURE CORROSION AND FLUID FLOW RATES
Edward Schaschl, Crystal Lake, Ill., assignor to Union Oil Company of California, Los Angeles, Calif., a corporation of California
Filed Dec. 6, 1965, Ser. No. 511,637
6 Claims. (Cl. 324—71)

This application is a continuation-in-part of application Serial No. 178,496, filed March 8, 1962, now abandoned.

This invention relates to a corrosion-test probe designed to measure the rate of corrosion of a specimen exposed to a corrosive environment under conditions of high temperature. In another aspect, this invention is directed to a method and apparatus for measuring the rate of flow of a fluid.

The prior art teaches the useof corrosion-test probes adapted to support and provide electrical contact with two strip-like metallic specimens, one of which specimens is coated with a corrosion-impervious material so that it will function as a temperature-compensating reference specimen. These test probes utilize methods which have been devised to make use of the correlation between change in electrical conductivity and change in cross-sectional area of an electrically-conductive specimen to determine the rate of corrosion of specimens fabricated of various materials of construction, through the use of a corrosion-test probe connected to an electronic resistance-change meter. These instruments, known and widely used in the art, function as analogue computers to indicate quantitatively the change in physical characteristics which cannot be conveniently measured by other methods. There are several recent modifications of this principle. One such modification is described in U.S. Patent 2,830,265. This application describes means for compensating for temperature changes when one test specimen is mounted in a position exposed to the corrosive environment, and another test specimen is isolated or protected from the corrosive effects of the environment by means of a suitable protective coating placed thereon. The coupons or specimens are connected in a circuit so as to comprise one-half of a typical resistance bridge. Suitable electrical connections are made with the other half of the bridge, which is placed outside of the corrosive environment, together with a power supply to the bridge. An appropriate electrical meter, such as a galvanometer, functions as a null detector. Loss of metal from the unprotected specimen induces small increases in resistance in the circuit, which increases are mathematically relative to the metal loss of the unprotected specimen. Metal loss can be calculated by appropriate formulae described in the aforenamed patent. Various corrosion probes which operate on this principle are described in detail in U.S. Patents Nos. 2,851,570, 2,864,252, 2,869,003, 2,991,439 and 2,994,219. Improved electronic resistance-change-measuring systems peculiarly adapted for use with such corrosion probes are described in U.S. Patent No. 2,824,283 to Lynn E. Ellison.

The corrosion-test probe of the instant invention can be used in conjunction with the alternating-current-type electronic circuitry described in the foregoing patent. Other resistance-ratio-change measurement devices can also be used. The corrosion-test probe of this invention is an improvement over the test probes previously proposed in that it provides means for measuring the extent of corrosion of a metal specimen in contact with an environment which is corrosive to a metal at high temperatures. As slightly modified, the apparatus is suitable for use for measuring the rate of flow of a fluid, especially a gas.

It becomes, therefore, a primary object of this invention to provide a corrosion-test probe suitable for use with an electronic resistance-measuring apparatus to determine the rate of corrosion of a test specimen at high temperatures. Another object of this invention is to provide a novel and improved flowmeter.

Briefly, the apparatus of this invention comprises a probe adapted to support two elongated, electrically conductive test specimens having a relatively great length to thickness ratio, preferably greater than 10 to 1. Means is provided for measuring the resistance ratio of the two specimens, and means is provided for passing a current through one of the specimens whereby the specimen is heated.

The invention is best described with reference to the drawing, of which

FIGURE 1 is a perspective view of a test probe fabricated in accordance with this invention, and FIGURE 2 is a schematic diagram of an electrical apparatus which may be used in accordance with this invention.

Referring to the drawing, steel ribbon or wire 10 is held at its ends by clamps 12 and 14, which are mounted on, and electrically insulated from, base member 16. The metal ribbon or wire 10 is also supported at its mid-point by electrically-conducting clamp 18, which clamp is supported from base member 16 by electrically conducting rod 20. Thus, ribbon or wire 10 is divided by clamp 18 into two segments or elements 22 and 24. Clamp 18 also acts as a heat sink whereby heat from element 22 will be carried off instead of being transferred to the compensating element 24. In order to mitigate heat transfer from element 22 to 24, the ribbon or wire 10 can be split in the middle and the split ends spaced apart and held in clamp 18. Clamp 18 may be made of material having low heat conductivity, such as nylon, equipped with electrically conductive contact points for the clamped ends of elements 22 and 24. Preferably, base member 16 is made of an electrically insulating material, such as plastic, to simplify construction and assure that the clamps and rod are insulated from each other. Electrical lead wires, not shown, can be attached to clamps 12 and 14 and to rod 20.

FIGURE 2 shows the electrical circuitry used in association with the test unit. Element 22 of ribbon or wire 10 is designated the test element, and is connected to be heated by means of direct current from battery 26, which flows through variable resistance 27, ammeter 28, and switch 30. The resistance and temperature of element 22 are determined by means of a circuit containing A.C. power source 32, potentiometer 34, and meter 36. The whole resistance-ratio-measuring circuit, designated 38, may amount to no more than a Wheatstone bridge circuit comprising the test element 22 as one arm, the compensating element 24 as an adjacent arm, and the two halves of potentiometer 34 as the remaining two arms. The bridge circuit is A.C.-energized and meter 36, of course, is an A.C. meter. It is preferred, however, to employ as the measuring circuit 38 a highly accurate resistance-ratio-change meter, such as is set forth in the aforementioned U.S. Patent No. 2,824,283 to Lynn E. Ellison.

In use, the test element 22 and compensating element 24 are exposed to an environment having high-temperature corrosive characteristics which are to be studied. The probe, for example, may be inserted in a container of petroleum-base lubricant, which, because of its sulfur content, is suspected to be corrosive to steel at high temperatures. The lubricant itself will most generally be at ambient temperatures and is kept in motion during the test by a suitable stirring mechanism. The direct-current power circuit and the A.C. measuring circuit are connected to the probe, as shown in FIGURE 2. The initial adjustments are made to balance the measuring circuit, for example, by adjusting potentiometer 34 so that there is no current flow through meter 36. During the time this initial balance is made, switch 30 is open, and the test element and compensating element are both at the same ambient temperature. Switch 30 is now closed, causing current to flow through test element 22 only. The test-element temperature increases to some value determined by the magnitude of the applied current and the thermal conductivity of the corrosive environment which is in contact with the test element 22. This increase in temperature works a corresponding increase in the resistance of the test element. This increase in resistance upsets the initial balance of the measuring circuit, and the change in the ratios of the resistances of test element 22 and compensating element 24 can conveniently be measured by means of the measuring circuit 38. This resistance ratio is, of course, proportional to the change in temperature ratio between the test element and compensating element, which initially were both at ambient temperatures. Knowing the change in resistance ratio and the resistance-temperature characteristics of the test element, it is possible to compute the actual change in temperature of test element 22.

It will sometimes be found more convenient to initially calculate the change in resistance ratio of the test element 22 to compensating element 24 which will correspond to a predetermined temperature of the test element. The compensating element remains at substantially the temperature of the corrosive environment. When a resistance ratio corresponding to the desired change in temperature is first calculated, the bridge is initially balanced as aforedescribed, switch 30 is closed, and potentiometer 27 then adjusted to provide a resistance-ratio change, as determined by the measuring circuit 38, which corresponds to the preselected temperature. In either case, the switch 30 is kept in the closed position for the duration of the test, so that the test element 22 will remain at the desired high temperature. At the conclusion of the test period, switch 30 is opened, and sufficient time permitted to elapse for the test element 22 and compensating element 24 to come to common temperature with the test environment. At this time, the permanent or corrosion-induced change in the resistance ratio of the test element and compensating element is measured and the extent of corrosion of the test element determined by means of circuit 38 in the usual way.

Where corrosion rate is not too high, the measuring circuit can be employed to calculate the extent of corrosion of the test element, and also to determine the extent to which the test element is heated, which is a novel feature of this invention. It will be observed that the temperature adjustment or measurement must be made at the beginning of the test, and that reliable temperature measurements cannot be made after corrosion of the test element occurs. This is because through the duration of the test it is impossible to distinguish between changes of resistance induced by temperature change and changes of resistance induced by corrosion. This is not a drawback, however, since once the measurement has been made it can safely be assumed that the temperature will remain constant so long as switch 30 is maintained in the closed position.

It is generally not necessary to coat the compensating element 24, as is taught by the prior art, to prevent the corrosion thereof. This is because during the test the element 24 remains at ambient temperature, i.e., at the temperature of the corrosive environment, and since the lubricant or other test environment is ordinarily stirred or circulated during the test, its temperature will not increase to a point where it is sufficiently corrosive to effect any detectable resistance change in compensating element 24. If desired, the compensating element can be coated with a corrosion-impervious material such as an epoxy resin, and such is recommended whenever it is thought the environment may work a substantial corrosion of the compensating element at temperatures attained in the test.

The test element and compensating element have been described as fabricated of steel. It is evident that they may be fabricated of any corrodible metal of interest. It is advisable to make the test and compensating elements of the same metal, and preferably from the same strip of metal, but this is not necessary as long as the test and compensating elements are made of conductive metals having the same temperature-resistance characteristic, that is, they respond to changes of temperature with corresponding changes of resistance. The test element at least will be made of a material which is corrodible by the environment under study at the temperature to which the element is heated.

When the system is used as a flowmeter, the apparatus will be exactly as described except that both the test element 22 and the comparison element 24 will be fabricated so that they are not corroded or eroded to a measureable exent by the flowing fluid. This can be accomplished by making the elements of a metal which is not readily corroded, such as stainless steel, or by making the elements of any desired metal and then coating them with a corrosion-impervious sheet, such as a very thin layer of an epoxy resin, or a very thin plating of a noble metal. For very high temperature work, it may be desirable to coat the test and compensating elements with a ceramic sheath. As used to measure fluid flow, the test probe assembly is disposed in a flowing stream, such as a gaseous stream, the switch 30 is maintained in the open position, and the bridge circuit is balanced. Switch 30 is then closed and current applied to heat test element 22. The magnitude of the current can be maintained at any desired value by means of potentiometer 27. The change in resistance ratio between the test and comparison specimens, which is a measure of the departure of the test specimen from the initial conditions of ambient temperature, is measured by measuring circuit 38. Thus, the device operates in a manner analogous to that described in U.S. Patent No. 2,612,047, to Henry O. Nilsson, but includes as a novel feature the disposition of both the test and compensating elements in the flowing stream. This has a substantial advantage in that fluctuations in temperature of the stream, while altering the actual temperature of the test and comparison elements, does not alter the resistance ratio measured by the bridge circuit and the flow rate calculated therefrom. Another advantage over the system of Nilsson is the elimination of a separate heating element by applying heating current directly to the test element. This is made possible by the use of a direct current for heating the test element and an alternating current for energizing the measuring circuit. In this way, interference between the heating and measuring circuits is avoided. Flow-rate readings may be taken at any time during the course of exposure of the probe. There will be no corrosion of the test element to introduce an extraneous reading and the capacitors 40 and 42 for practical purposes, isolate the elements 22 and 24 from the bridge insofar as the direct current is concerned so that element 24 is not heated.

The conversion of resistance-ratio measurement into corrosion rate is well known in the art and described in the aforementioned patents. The method of calculating the temperature change by resistance ratio can be accomplished from the following formula:

$$T = \left(\frac{R_f}{R_i} - 1\right)\left(\frac{1}{\alpha} + \Delta T\right)$$

where:

T is the temperature difference to be determined, in °F.,
$R_i$ is the initial ratio of the resistances of the elements,
$R_f$ is the final ratio of the resistances of the elements,
$\alpha$ is the resistance-temperature coefficient of the elements, per °F., and ΔT is the change in temperature, if any, of the compensating element.

Since the temperature of the compensating element ordinarily does not change appreciably from ambient temperatures, ΔT approaches zero and this term may be neglected, since α is always small, and its reciprocal large. In practice, it is believed that it will always be best to eliminate the term ΔT. This term is included in the equation only to make the equation technically accurate.

The embodiments of the invention in which an exclusive property or privilege is claimed are defined as follows:

1. The method of measuring the high-temperature corrosion of a test element comprising
    (a) exposing a bare, elongated test element and a compensating element having similar temperature-resistance characteristics, to an environment corrosive to said test element at elevated temperatures,
    (b) measuring the ratio of resistances of said elements at ambient temperature before corrosion of test element,
    (c) heating said test element to an elevated temperature at which corrosion occurs, by passing an electric current therethrough while maintaining said compensating element at substantially ambient temperature,
    (d) measuring the resistance ratio of said elements at said elevated temperature in order to determine the temperature to which the test element has been heated,
    (e) maintaining said test element at said elevated temperature by continuing the flow of heating current therethrough for a period of time sufficient to induce measureable corrosion of said element while at the same time maintaining the compensating element at substantially ambient temperature,
    (f) thereafter discontinuing flow of heating current through said test element and allowing it to cool to ambient temperature,
    (g) determining the ratio of the resistances of said elements at ambient temperature after the test element is corroded, and
    (h) determining the extent of corrosion of said test element at said elevated temperature by comparison of the change in the aforesaid resistance ratio before and after corrosion.

2. The method in accordance with claim 1 including the step of varying the magnitude of the current passed through said test element to provide a predetermined temperature of said test element as determined by a predetermined change in the ratio of the resistances of said elements, said change occurring when said current is applied.

3. The method in accordance with claim 1 in which said electric current applied is a direct current, and the ratio of the resistances of said elements is determined by passing an alternating current through said elements.

4. An apparatus for measuring the high-temperature corrosion of a test element comprising
    (a) bare, elongated, electrically conductive, corrodible test element,
    (b) an elongated compensating element having temperature-resistance characteristics similar to that of said test element,
    (c) electrical conductors joined to the ends of said elements,
    (d) means for applying a heating current to the test element without applying it to said compensating element, and
    (e) an alternating bridge circuit connected to said conductors for measuring the resistance ratio of said elements.

5. An apparatus in accordance with claim 4 in which item (b) is coated with a corrosion-impervious material.

6. A fluid flowmeter comprising
    (a) a bare elongated, electrically conductive element substantially non-corrodible in the environment in which it is to be used,
    (b) an elongated, corrosion-impervious comparison element having a temperature-resistance characteristic similar to that of the test element,
    (c) electrical conductors joined to the ends of said elements,
    (d) electrical insulating means for supporting said elements in a unitary structure,
    (e) means for applying direct current to said test element without applying it to said comparison element, of sufficient magnitude to heat said test element,
    (f) alternating current means connected in a bridge circuit across said conductors, and
    (g) means in said bridge circuit for measuring the ratio of the resistances of said elements.

References Cited by the Examiner
UNITED STATES PATENTS

| | | | |
|---|---|---|---|
| 2,652,721 | 9/1953 | McMillan et al. | 73—204 X |
| 2,800,018 | 7/1957 | Phillips et al. | 73—204 |
| 2,824,283 | 2/1958 | Ellison | 324—65 |
| 3,096,650 | 7/1963 | Lowenstein et al. | 324—62 X |

WALTER L. CARLSON, *Primary Examiner.*

C. F. ROBERTS, *Assistant Examiner.*